United States Patent
Nou

(10) Patent No.: US 7,599,769 B2
(45) Date of Patent: Oct. 6, 2009

(54) SYSTEM AND METHOD FOR REPORTING VEHICLE THEFT USING TELEMATICS SYSTEM

(75) Inventor: Seong Taeg Nou, Icheon-shi (KR)

(73) Assignee: Hyundai Autonet Co., Ltd., Icheon-Shi, Kyungki-Do (KR)

( * ) Notice: Subject to any disclaimer, the term of this patent is extended or adjusted under 35 U.S.C. 154(b) by 822 days.

(21) Appl. No.: 11/162,340

(22) Filed: Sep. 7, 2005

(65) Prior Publication Data

US 2006/0122774 A1    Jun. 8, 2006

(30) Foreign Application Priority Data

Dec. 7, 2004    (KR) .................. 10-2004-0102072

(51) Int. Cl.
*B60R 25/00* (2006.01)
(52) U.S. Cl. .................. 701/32; 701/213; 701/29; 340/426.19
(58) Field of Classification Search .................. None
See application file for complete search history.

(56) References Cited

U.S. PATENT DOCUMENTS

| | | | |
|---|---|---|---|
| 6,337,621 B1 * | 1/2002 | Ogino et al. ............. | 340/425.5 |
| 7,225,065 B1 * | 5/2007 | Hunt et al. .................... | 701/29 |
| 7,319,378 B1 * | 1/2008 | Thompson et al. ........ | 340/426.1 |
| 7,355,510 B2 * | 4/2008 | Rockett et al. .......... | 340/426.19 |
| 2002/0080015 A1 * | 6/2002 | Kobayashi et al. .......... | 340/426 |
| 2002/0123833 A1 * | 9/2002 | Sakurai et al. ................ | 701/33 |
| 2003/0095039 A1 * | 5/2003 | Shimomura et al. ...... | 340/426.1 |
| 2005/0137797 A1 * | 6/2005 | Oesterling et al. .......... | 701/213 |

FOREIGN PATENT DOCUMENTS

| | | |
|---|---|---|
| KR | 1020040035290 | 4/2004 |
| KR | 1020040035295 | 4/2004 |
| KR | 1020040035297 | 4/2004 |
| KR | 1020040033101 | 10/2004 |

* cited by examiner

Primary Examiner—Michael J. Zanelli
(74) Attorney, Agent, or Firm—IPLA P.A.; James E. Bame

(57) ABSTRACT

A system and method for reporting a vehicle theft using a telematics system is provided. The system includes a telematics terminal for determining existence or not of a trespasser, generating a theft detection message, and diagnosing the vehicle status and generating diagnostic information; a communication terminal for receiving a predetermined theft notification message and a relevant organization notification or non-notification selection message, and generating a relevant notification request signal; and a service providing center for detecting the inherent number, searching for a subscriber having the inherent number, transmitting a theft notification message, and transmitting a vehicle theft notification message to a relevant organization.

6 Claims, 4 Drawing Sheets

SYSTEM AND METHOD FOR REPORTING VEHICLE THEFT USING TELEMATICS SYSTEM

BACKGROUND OF THE INVENTION

1. Field of the Invention

The present invention relates to a telematics system, and more particularly, to a system and method for reporting a vehicle theft using a telematics system, for detecting a third party's trespassing on a vehicle, and informing a vehicle owner, who is distant away from a vehicle, of the trespassing.

2. Description of the Related Art

In recent years, a telematics system is one of technologies attracting attention. The telematics system detects occurrence of vehicle accident or theft, guides a vehicle running path, and provides a vehicle driver with a variety of other information using a mobile communication method and a position tracing method associated with Internet. In other words, the telematics system provides information through a vehicle based on a Global Positioning System (GPS) using a mobile communication system and a GPS satellite. Accordingly, the telematics system is expected to provide a variety of mobile communication services, such as traffic information, countermeasure to an emergency situation, remote vehicle diagnosis, the use of Internet (for example, financial transaction, provision of news, and transmission and reception of e-mail), using the GPS, a wireless communication network and an Internet network.

One of the reasons why the telematics system attracts attention is that it creates a newly conceptive value added service, which is able to maximize a synergy effect by merging an automobile industry with an Information Telecommunication (IT) industry.

Accordingly, a standardization group of telematics is provided. In the standardization group, there are being standardized an operation and a function of each constituent part of the telematics system, a communication protocol between the constituent parts, and services using a communication network.

If a telematics service is realized, a car can be reconstructed through a wire or wireless communication and broadcasting network, using Internet, which is a third space following an office space and a home space, and can be associated with home networking and office automation through a hetero communication and broadcasting network and an intelligent terminal, thereby providing a service for home and office even to the car without interruption.

Together with the spotlight of a telematics technology and the development of the telematics system, a variety of service contents satisfying a user's desire are being required.

SUMMARY OF THE INVENTION

Accordingly, the present invention is directed to a system and method for reporting a vehicle theft using a telematics system that substantially overcomes one or more of the limitations and disadvantages of the conventional art.

An object of the present invention is to provide a system and method for reporting a vehicle theft using a telematics system, for detecting a third party's trespassing on a vehicle, and informing a vehicle owner, who is distant away from a vehicle, of the trespassing.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided a system for reporting a vehicle theft using a telematics system connected with a relevant organization and having a GPS (Global Positioning System) and a vehicle diagnosing unit diagnosing a vehicle status, the system including: a telematics terminal for determining existence or not of a trespasser, generating a theft detection message having its own inherent number upon existence of the trespasser, driving the GPS to generate position information, and controlling the vehicle diagnosing unit to diagnose the vehicle status and generate diagnostic information; a communication terminal for receiving a predetermined theft notification message and a relevant organization notification or non-notification selection message, and receiving a relevant organization notification request from a subscriber and generating a relevant notification request signal; and a service providing center for, upon reception of the theft detection message and the position information and diagnostic information, detecting the inherent number from the theft detection message, searching subscriber information for a subscriber having the inherent number, connecting to the communication terminal having the inherent number for the subscriber to transmit a theft notification message to the communication terminal, and upon reception of the relevant organization notification request message in response to transmission of the theft notification message, transmitting a vehicle theft notification message to a relevant organization.

In another aspect of the present invention, there is provided a method for reporting a vehicle theft using a telematics system having a communication terminal, a service providing center, a telematics terminal, and a relevant organization connected with the service providing center through a communication network, the method including the steps of: in the telematics terminal, determining existence or not of a trespasser, generating a theft detection message having its own inherent number upon existence of the trespasser, driving the GPS to generate position information, and controlling the vehicle diagnosing unit to diagnose the vehicle status and generate diagnostic information; in the service providing center, upon reception of the theft detection message and the position information and diagnostic information, detecting the inherent number from the theft detection message, searching subscriber information for a subscriber having the inherent number, and connecting to the communication terminal having the inherent number for the subscriber to transmit a theft notification message to the communication terminal; in the communication terminal, receiving a predetermined theft notification message and a relevant organization notification or non-notification selection message, and receiving a relevant organization notification request from a subscriber and generating a relevant notification request signal; and in the service providing center, upon reception of the relevant organization notification request message in response to transmission of the theft notification message, transmitting a vehicle theft notification message to a relevant organization.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings.

DETAILED DESCRIPTION OF THE INVENTION

Figure 1:
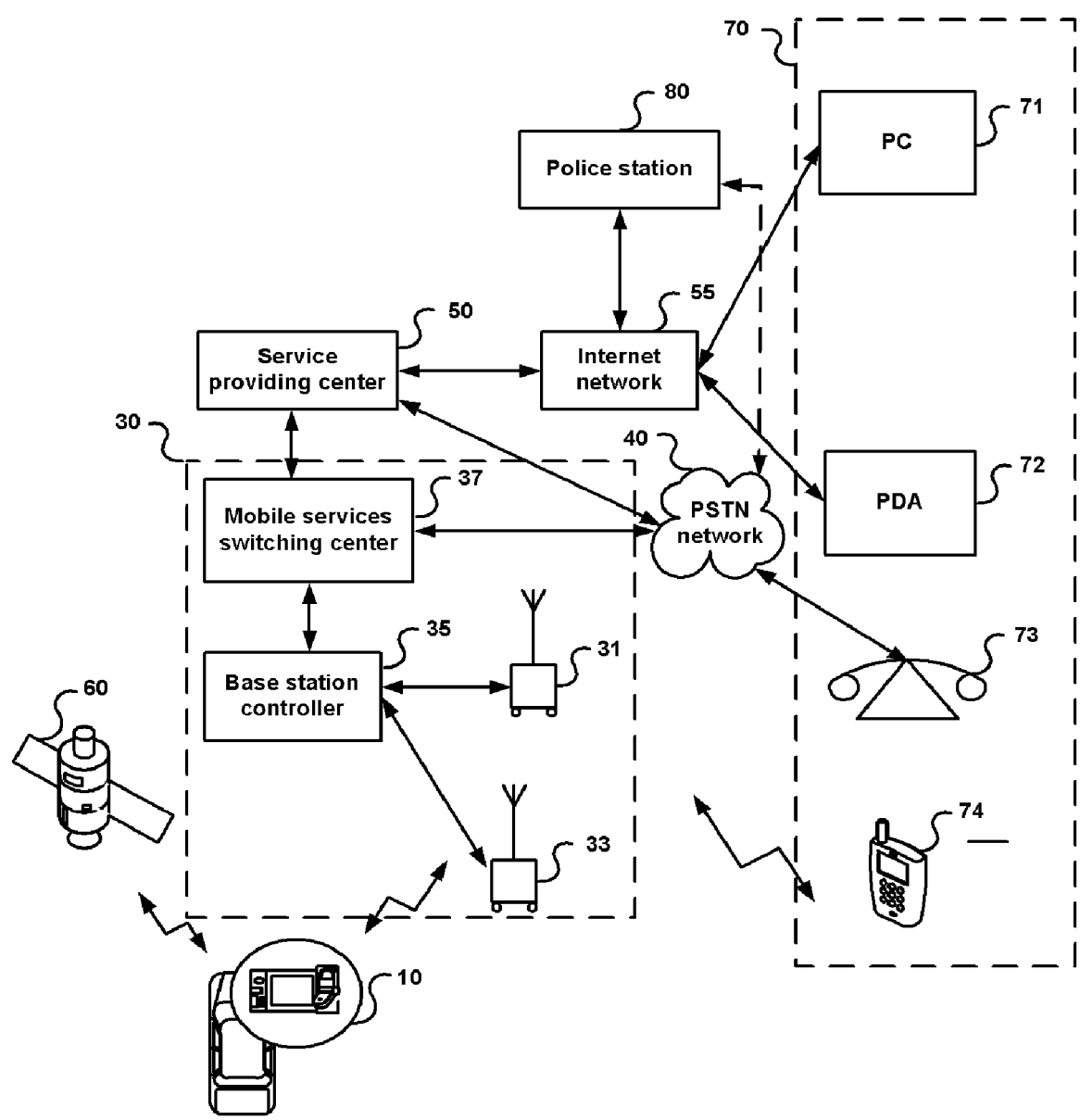
FIG. 1 illustrates a construction of a system for reporting a vehicle theft using a telematics system according to the present invention.

Reference will now be made in detail to the preferred embodiments of the present invention, examples of which are illustrated in the accompanying drawings. Wherever possible, the same reference numerals will be used throughout the drawings to refer to the same or like parts.

In the present invention, in case where a third party trespasses on a vehicle equipped with a telematics terminal of a telematics system, a vehicle owner is informed of the occurrence of vehicle theft using the telematics system, and in case where a user reports the vehicle theft, a position of the stolen vehicle is detected using a Global Positioning System (GPS) of the telematics system, thereby informing a relevant organization, that is, a police station of vehicle theft and position information.

FIG. 1 illustrates a construction of a system for reporting a vehicle theft using the telematics system according to the present invention.

The inventive theft reporting system using the telematics system includes the telematics terminal 10, a mobile communication network 30, a Public Switching Telecommunication Network (PSTN) 40, a service providing center 50, an Internet network 55, an artificial satellite 60, a communication terminal 70, and a relevant organization 80.

The telematics terminal 10 receives position information from an artificial satellite 60, maps the received position information to a previously stored map data, and displays a car's position on a displaying device such as a Liquid Crystal Display (LCD). Further, even when the telematics terminal 10 receives a position track request signal from the service providing center 50 through the mobile communication network 30, it detects its position and generates position information to transmit the generated position information to the service providing center 50 through the mobile communication network 30. The telematics terminal 10 can be connected with the mobile communication network 30 using a portable mobile communication terminal (not shown), or can be also connected with the mobile communication network 30 using its internally installed wireless communication unit 23 (refer to FIG. 2). Through the telematics terminal 10, the telematics system subscriber can receive traffic information through the mobile communication network 30, display the received traffic information on the LCD, and receive a service of information such as a current traffic situation. Further, the telematics terminal 10 diagnoses a vehicle status, and informs the user of the diagnosed vehicle status through the telematics system.

The service providing center 50 is connected with the mobile communication network 30, the PSTN 40, and the Internet network 55. The service providing center 50 is wirelessly connected with the telematics terminal 10 through the mobile communication network 30, to receive the vehicle position information from the telematics terminal 10 and transmit the received vehicle position information to the telematics system subscriber through the mobile communication network 30, the PSTN 40, or the Internet network 55 connecting with the telematics system subscriber. The transmitted vehicle position information can be a character, a graphic icon, voice, and the like depending on a type of a communication network connecting with the subscriber. For example, in case where the subscriber connects to the service providing center 50 through the PSTN being a wire communication network, the vehicle position information can be the voice. In case where the subscriber connects to the service providing center 50 though a cell phone or a Portable Digital Assistants (PDA) being a mobile communication terminal, the vehicle position information can be the voice, the character, and/or the graphic icon. Further, the service providing center 50 should have a number of the telematics terminal of each remote vehicle diagnostic service subscriber, and an authentication password and/or a resident registration number for the telematics terminal, to authenticate the subscriber and allow the connection to the corresponding telematics terminal.

According to the present invention, in order to provide a theft report service, the service providing center 50 should receive and hold a telematics terminal 10 number for connecting with the telematics terminal 10 through the wireless communication network 30, a communication terminal identifier of a subscriber having the telematics terminal 10 number registered, information on service subscription or not, and an inherent authentication password from the subscriber.

The communication terminal 70 can be any one of a Personal Computer (PC) 71 connecting to the service providing center 50 through the Internet network 55, the PDA 72 connecting to the service providing center 50 through the Internet network 55 or the mobile communication network 30, a line telephone set 73 connected to the service providing center 50 through the PSTN 40, and the cell phone 74 connecting to the service providing center 50 through the mobile communication network 30. According to the present invention, the communication terminal 70 receives the vehicle position information from the service providing center 50, and informs a user of the received vehicle position information through the LCD, a monitor or a speaker.

The relevant organization 80 can be the police station and the like. The relevant organization 80 is connected with the service providing center 50 through the Internet network 55, the PSTN 40 or the mobile communication network 30, and receives a vehicle theft notification message from the service providing center 50. At this time, a police officer will be capable of receiving the vehicle theft notification message to confirm the position of the stolen vehicle, and quickly move to the corresponding position.

Figure 2:
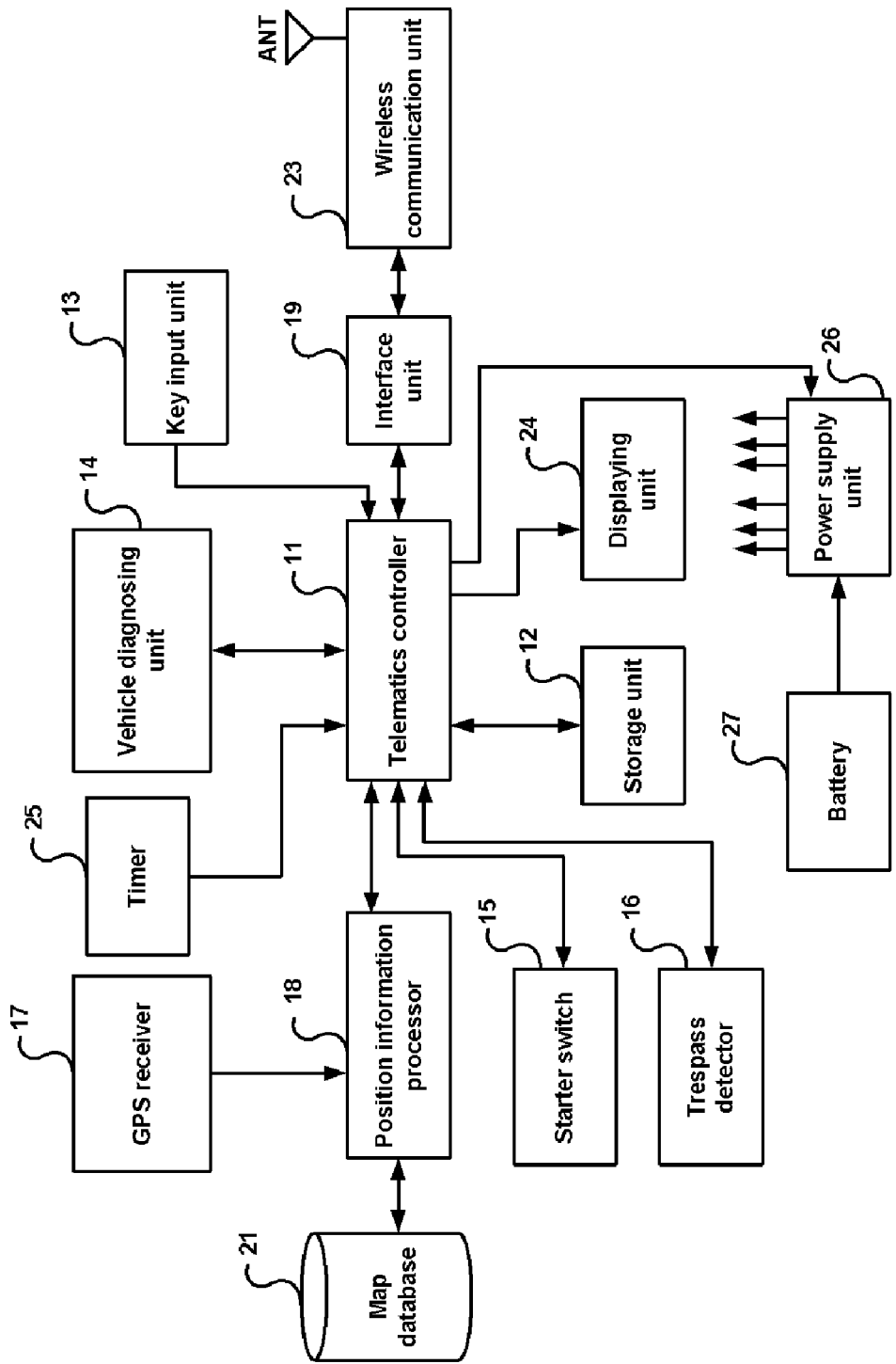
FIG. 2 illustrates a construction of a telematics terminal according to the present invention.

FIG. 2 illustrates a construction of the telematics terminal according to the present invention.

Referring to FIG. 2, a construction and an operation of the telematics terminal will be described below.

The telematics terminal 10 includes a telematics controller 11, a storage unit 12, a key input unit 13, a vehicle diagnosing unit 14, a starter switch 15, a trespass detector 16, a GPS receiver 17, a position information processor 18, an interface unit 19, a map database 21, the wireless communication unit 23, a displaying unit 24, a power supplying unit 26, and a battery 27. In case where the wireless communication unit 23 is a built-in type, the telematics terminal 10 can be configured even without the interface unit 19.

The telematics controller 11 controls a general operation of the telematics terminal 10. The storage unit 12 includes a region for storing a control program for controlling the operation of the telematics terminal 10; a region for temporarily storing data, which is generated during the execution of the control program; and a region for storing a user data, such as a position track unset password, the vehicle diagnostic information, the vehicle position information, and the authentication password, which is used for authentication when a vehicle position is requested.

The key input unit 13 includes a plurality of alphanumeric keys, a function key, a mode key, an end key, a power key, and a remote position track key, and generates key data for the keys. The remote position track key is used to set or unset the vehicle position track, and set the vehicle position track unset password. The remote position track key can be recognized by a combination of other keys for security. The vehicle diagnosing unit 14 detects a status signal of each constituent part of the car from a plurality of sensors, which are positioned at exterior or interior constituent parts of the car, and transmits the detected status signal to the telematics controller 11. The vehicle diagnosing unit 14 can receive the status signal in a direct connection with the plurality of sensors, or can receive the status signal or the vehicle diagnostic information of each constituent part of the car through the ECU or TCU connected with the plurality of sensors. The sensors can be exemplified as a collision sensor for sensing the collision at a front or rear of the car, an airbag sensor for sensing the activation of the airbag when a sensed value of the collision sensor is larger than a predetermined value, a sensor for checking an amount of car's oil, and a sensor for sensing the opening or closing of the window, the door, and the trunk. Further, the vehicle diagnosing unit 14 detects theft using the sensors under the control of the telematics controller 11. In other words, if the third party unlawfully opens the vehicle door, window, and trunk, the vehicle diagnosing unit 14 detects the unlawful opening, generates a theft detection signal, and outputs the generated theft detection signal to the telematics controller 11.

The displaying unit 24 displays a variety of information, such as operation mode and state of the telematics system, and the car status, in a graphic or text format, under the control of the telematics controller 11. The displaying unit 24 can employ the LCD and the like.

The timer 25 counts a time, and provides information on the counted time to the telematics controller 11.

The interface unit 19 is connected with a Universal Asynchronous Receiver and Transmitter (UART)(not shown) of the wireless communication unit 23, and wireless connects the telematics terminal 10 with a base station 33 of FIG. 1. In case where the wireless communication unit 23 is a built-in type, the telematics terminal 10 can be configured without the interface unit 19.

The starter switch 15 supplies a power to the vehicle, or starts an engine of the powered vehicle under the control of the telematics controller 11. When the car status is diagnosed, the telematics terminal 10 and the vehicle should be in a powered state. Therefore, the telematics controller 11 should control the starter switch 15 to supply the power to the vehicle and start the engine of the powered vehicle.

The trespass detector 16 detects a moving object within the vehicle, and detects whether or not there is a trespasser. The trespass detector 16 can employ a pressure sensor or an infrared sensor disposed at seats, and digitalize and output an output value from the sensors, or can also output only detection or not (0 or 1).

The map database 21 stores map data on positional road and building. The GPS receiver 17 receives the position information from the plurality of artificial satellites 60, and outputs the received position information to the position information processor 18. The position information processor 18 receives the position information from the GPS receiver 17, and reads the map data on the position of the received position information from the map database 21, and outputs the read map data to the telematics controller 11.

The power supplying unit 26 receives a power source from the car battery 27, converts the received power source into an operation power source for operating the telematics terminal, and supplies the converted power source to each constituent part. When the power supplying unit 26 receives a power key signal from the key input unit 13, it turns on/off the power source supplied to the telematics terminal 10 under the control of the controller 11.

In case where the inventive telematics controller 11 is set in a position track mode, it does not turn off the power source when receiving the power key signal, and it turns off the power source only when receiving the position track unset password. In detail, even when the power source is turned off, the telematics controller 11 supplies the power source to constituent parts for transmitting the position information according to the present invention. For example, the power source is supplied to the GPS receiver 17, the position information processor 18, the map database 21, the telematics controller 11, the timer 25, the storage unit 12, the key input unit 13, the interface unit 19, and the wireless communication unit 23, and is not supplied to the displaying unit 24, the vehicle diagnosing unit 14, and the starter switch 15. This is to prevent a vehicle thief from becoming aware of being currently tracked in position.

Figure 3:
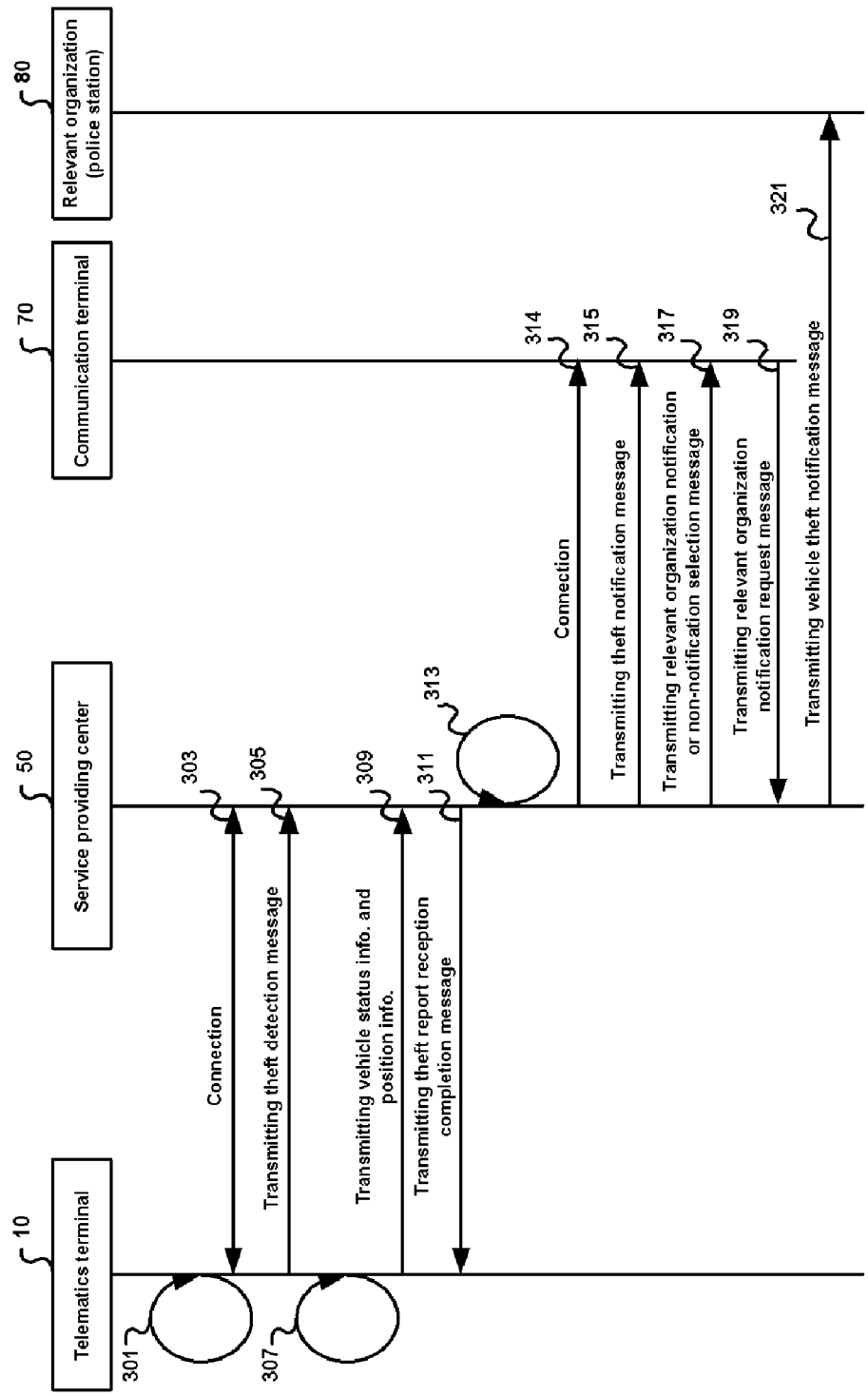
FIG. 3 is a flowchart illustrating a method for reporting a vehicle theft using a telematics system according to the first embodiment of the present invention.

FIG. 3 is a flowchart illustrating a method for reporting the vehicle theft using the telematics system according to the first embodiment of the present invention.

Referring to FIGS. 1 to 3, the inventive method for reporting the vehicle theft will be described below.

The telematics system subscriber should subscribe to the service providing center 50 for a theft report service. As described above, the service providing center 50 should receive and hold the telematics terminal 10 number for connecting with the telematics terminal 10 through the wireless communication network 30, the communication terminal identifier of a subscriber having the telematics terminal 10 number registered, the information on service subscription or not, and the inherent authentication password from the subscriber. When the communication terminal 70 is the line telephone set 73, the communication terminal identifier can be a line telephone number. When the communication terminal 70 is the cell phone 74, the communication terminal identifier can be a cell phone number. When the communication terminal 70 is the line telephone set 73, the inherent authentication password can be a numeric password. When the communication terminal 70 is the PC 71, the PDA 72, and the cell phone 74, the inherent authentication password can be an IDentification (ID) and a password such as a numeral or a character. When the communication terminal 70 is the line telephone set 73, the service providing center 50 uses an Automatic Response System (ARS). It is desirable that additional authentication information such as a resident registration number is requested using the ARS, to reinforce safety.

Describing with reference to FIG. 3 below, first, the telematics controller 11 of the telematics terminal 10 determines whether or not a theft signal is received from the vehicle diagnosing unit 14 or the trespass detector 16 in Step 301. If it is determined that the theft signal is inputted from the vehicle diagnosing unit 14 or the trespass detector 16, the telematics controller 11 connects to the service providing center 50 via the mobile communication network 30 through the wireless communication unit 23 in Step 303. If the telematics controller 11 connects to the service providing center 50, it transmits a theft detection message to the service providing center 50 in Step 305. After that, the telematics controller 11 diagnoses the vehicle through the vehicle diagnosing unit 14 in Step 307, and particularly diagnoses the opening or closing of the vehicle door, window, and trunk to generate and store diagnostic information, and controls the position information processor 18 to detect a current position, thereby generating and storing position information in Step 307. If the diagnostic information and the position information are generated and stored, the telematics controller 11 transmits the diagnostic information and the position information to the service providing center 50 in Step 309. The theft detection message includes an inherent number of the telematics terminal 10. If a GPS signal is not received in the position detection, the telematics controller 11 transmits position information on a position the latest detection of which succeeds.

When the service providing center 50 receives the diagnostic information and the position information, it transmits a theft report reception completion message of indicating that a theft report reception is completed, to the telematics terminal 10 in Step 311. After that, the service providing center 50 detects an inherent number of the telematics terminal from the theft detection message, and searches for an owner's communication terminal identification number for the inherent number in Step 313. When the communication terminal 70 is the line telephone set 73, the communication terminal identification number can be the line telephone number and the cell phone number. When the communication terminal 70 is the cell phone 74, the communication terminal identification number can be the cell phone number. If the communication terminal identification number is searched in the Step 313, the service providing center 50 connects with the communication terminal 70 having the searched communication terminal identification number in Step 314, and transmits a theft notification message in Step 315. If connection is not made in the Step 314, that is, if the owner is on the phone, the service providing center 50 can repeat to attempt the connection at a predetermined period.

Next, the service providing center 50 transmits a relevant organization notification or non-notification selection message of inquiring whether or not to report the theft to the relevant organization, to the communication terminal 70 in Step 317. When the owner selects to report the theft to the relevant organization, the communication terminal 70 generates and transmits a relevant organization notification request message to the service providing center 50 in Step 319.

Thus, the service providing center 50 transmits a vehicle theft notification message to the relevant organization 80 in Step 321. The vehicle theft notification message can include information for informing the occurrence or not of the theft, the position information, the diagnostic information and/or a vehicle registration number. The vehicle registration number can be transmitted in the following methods: a method of, when the telematics terminal 10 transmits vehicle status information and position information, transmitting the vehicle registration number together, and a method of transmitting the vehicle registration number registered to the service providing center 50 in service subscription.

A worker of the relevant organization 80 receiving the vehicle theft notification message will be able to easily seek the stolen vehicle equipped with the telematics terminal 10, using clues of the vehicle registration number and the position information.

Figure 4:
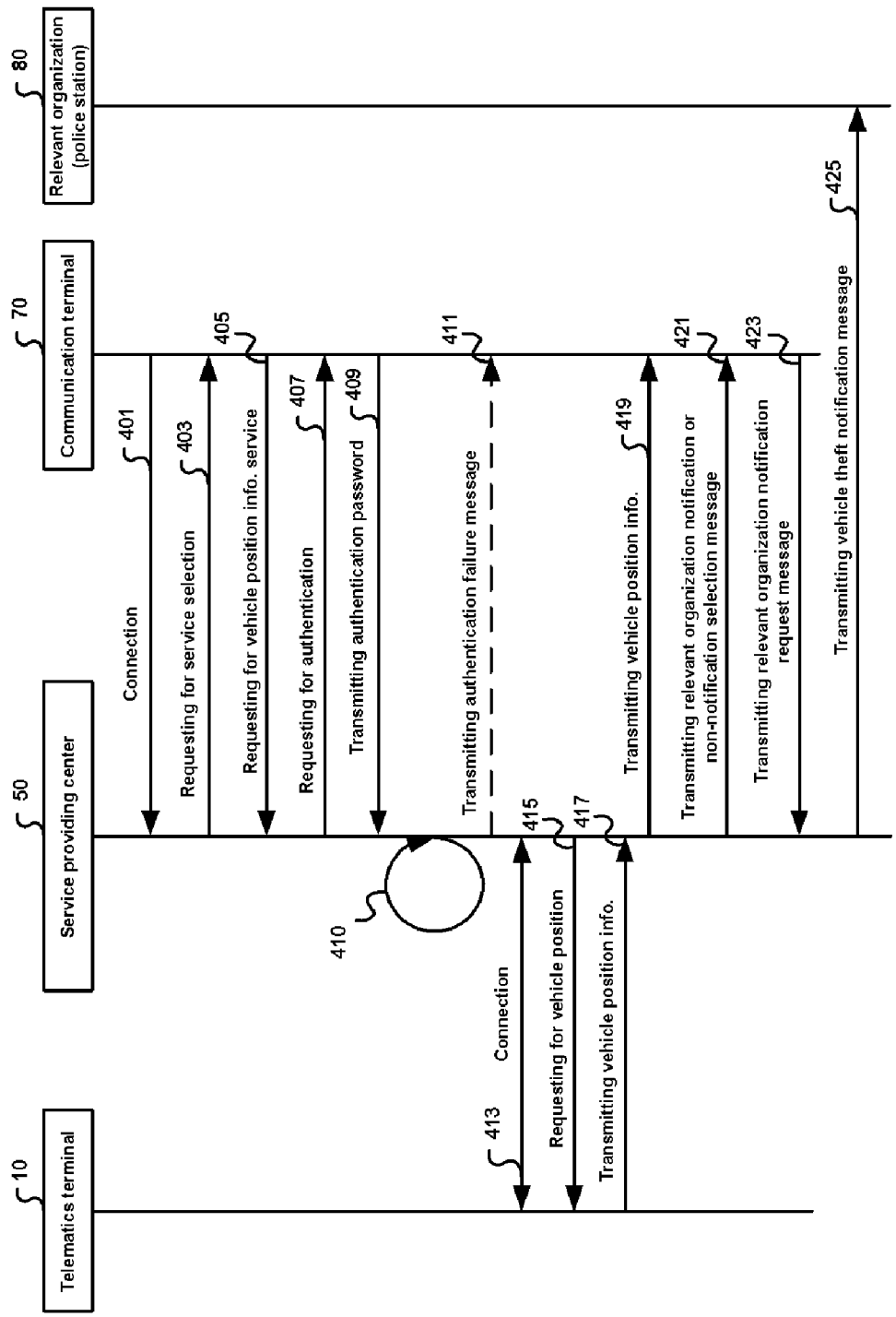
FIG. 4 is a flowchart illustrating a method for reporting a vehicle theft using a telematics system according to the second embodiment of the present invention.

FIG. 4 is a flowchart illustrating a method for reporting the vehicle theft using the telematics system according to the second embodiment of the present invention. A description will be made with reference to FIGS. 1, 2 and 4 below.

If the communication terminal 70 receives a service providing center connection command from the subscriber, it connects to the service providing center 50 in Step 401. When the communication terminal 70 is the line telephone set 73, the connection command can be a telephone number of the service providing center 50, and when the communication terminal 70 is the Internet, the connection command can be a service request command of Internet Homepage of the service providing center 50.

If the communication terminal 70 connects to the service providing center 50, the service providing center 50 transmits a service selection request signal for in-services in Step 403. The service selection request signal can be a graphic or text signal and a voice signal depending on a type of the communication terminal 70. The communication terminal 70 receives the service selection request signal, and determines whether or not the user selects one of a plurality of services. If the theft report service is selected from the services, the communication terminal 70 transmits a vehicle theft report service request signal to the service providing center 50 through a corresponding network in Step 405. If so, the service providing center 50 transmits an authentication request signal to the communication terminal 70 in Step 407 in order to determine whether or not the subscriber using the communication terminal 70 transmitting the vehicle theft report service request signal is a registered subscriber. The communication terminal 70 receives the authentication request signal and receives an authentication password from the subscriber, and transmits the received authentication password to the service providing center 50 in Step 409.

The service providing center 50 receives the authentication password, and determines whether or not the received authentication password is the same as a previously stored authentication password for the subscriber in Step 410. If it is determined that they are the same, the service providing center 50 connects to the telematics terminal 10 for the subscriber in Step 413. The connection is requested by the service providing center 50, and it is desirable that the service providing center 50 includes an inherent identifier for informing that itself is just the service providing center 50. Whereas, if it is determined that the received authentication password is not the same as the previously set authentication password, the service providing center 50 transmits an authentication failure message to the communication terminal 70 in Step 411.

Only when the telematics terminal 10 receives an incoming call having its own number including the inherent identifier, it forms a communication path and connects with the service providing center 50.

If the service providing center 50 connects to the telematics terminal 10, it transmits a vehicle position request signal for requesting the vehicle position information, to the telematics terminal 10 in Step 415. Then, the telematics terminal 10 receives the detected vehicle position information through the position information processor 18 in the Step 415, and transmits the received vehicle position information to the service providing center 50 in Step 417.

The service providing center 50 receives the vehicle position information from the telematics terminal 10 in the Step 417, converts the received vehicle position information into vehicle position track information suitable to the communication terminal 70, which has requested the vehicle theft report service, and transmits the converted vehicle position track information to the communication terminal 70 in Step 419. For example, when the communication terminal 70 is the line telephone set 73, the service providing center 50 converts text data of the received vehicle position information into voice data, and transmits the converted voice data to the telematics terminal 70. When the communication terminal is the PC 71, the PDA 72 or the cell phone 74, the service providing center 50 converts the vehicle position information into the voice, text or graphic, and transmits the converted voice, text or graphic to the telematics terminal 70.

The communication terminal 70 receives the vehicle position information from the service providing center 50, and informs the subscriber of the vehicle position information in voice, text and/or graphic.

After the transmitting of the vehicle position information, the service providing center 50 transmits the vehicle position information and a relevant organization notification or non-notification selection message for inquiring whether or not to report the theft, to the communication terminal 70 in Step 421.

Thus, the communication terminal 70 receives the relevant organization notification or non-notification selection message from the service providing center 70, and informs the subscriber of the reception of the notification or non-notification selection message. At this time, when the subscriber selects a relevant organization notification in response to the relevant organization notification or non-notification selection message, the communication terminal 70 generates and transmits a relevant organization notification request message to the service providing center 50 in Step 423.

The service providing center 50 receives the relevant organization notification request message from the communication terminal 70, and transmits the vehicle theft notification message to the relevant organization 80 in Step 425.

As described above, the present invention has an advantage in that since the vehicle owner can detect the position of his/her owning vehicle, when the vehicle is stolen, he/she can report the position information together with the theft report to the police station, and the police officer can receive the position information while searching for the stolen vehicle, and can rapidly catch the vehicle thief.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A system for reporting a vehicle theft using a telematics system connected with a relevant organization and having a GPS (Global Positioning System) and a vehicle diagnosing unit diagnosing a vehicle status, the system comprising:
   a telematics terminal for determining existence or not of a trespasser, generating a theft detection message having its own inherent number upon existence of the trespasser, driving the GPS to generate position information, and controlling the vehicle diagnosing unit to diagnose the vehicle status and generate diagnostic information;
   a subscriber communication terminal for receiving a predetermined theft notification message and a relevant organization notification or non-notification selection message for selection by a subscriber, and for generating a relevant notification request signal in response to the message selected by the subscriber; and
   a service providing center for, upon reception of the theft detection message and the position information and diagnostic information, detecting the inherent number from the theft detection message, searching subscriber information for a subscriber having the inherent number, connecting to the subscriber communication terminal having the inherent number for the subscriber to transmit a theft notification message to the subscriber communication terminal, and upon reception of the relevant organization notification request signal from the subscriber communication terminal, transmitting a vehicle theft notification message to a relevant organization.

2. The system according to claim 1, wherein the theft detection message has a vehicle registration number.

3. The system according to claim 2, wherein the vehicle theft notification message has the vehicle registration number.

4. A method for reporting a vehicle theft using a telematics system having a subscriber communication terminal, a service providing center, a telematics terminal, and a relevant organization connected with the service providing center through a communication network, the method comprising the steps of:
   in the telematics terminal, determining existence or not of a trespasser, generating a theft detection message having its own inherent number upon existence of the trespasser, driving the GPS to generate position information, and controlling the vehicle diagnosing unit to diagnose the vehicle status and generate diagnostic information;
   in the service providing center, upon reception of the theft detection message and the position information and diagnostic information, detecting the inherent number from the theft detection message, searching subscriber information for a subscriber having the inherent number, and connecting to the subscriber communication terminal having the inherent number for the subscriber to transmit a theft notification message to the subscriber communication terminal;
   in the subscriber communication terminal, receiving a predetermined theft notification message and a relevant organization notification or non-notification selection message for selection by the subscriber, and for generating a relevant notification request signal in response to the message selected by the subscriber; and
   in the service providing center, upon reception of the relevant organization notification request signal from the subscriber communication terminal, transmitting a vehicle theft notification message to a relevant organization.

5. The method according to claim 4, wherein the theft detection message has a vehicle registration number.

6. The method according to claim 5, wherein the vehicle theft notification message has the vehicle registration number.

* * * * *